United States Patent
Iwabuchi

(10) Patent No.: US 6,204,495 B1
(45) Date of Patent: Mar. 20, 2001

(54) IMAGE READING METHOD AND APPARATUS HAVING A DEFLECTING DEVICE

(75) Inventor: Yasuo Iwabuchi, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/315,942

(22) Filed: May 21, 1999

(30) Foreign Application Priority Data

May 22, 1998 (JP) .................................................. 10-140691

(51) Int. Cl.$^7$ ..................................................... H01L 27/00
(52) U.S. Cl. ...................................... 250/208.1; 250/483.4
(58) Field of Search .............................. 250/208.1, 483.1, 250/483.4, 234, 235; 378/62, 63, 70, 71, 74, 87, 88

(56) References Cited

U.S. PATENT DOCUMENTS

| 4,816,679 | 3/1989 | Sunagawa et al. ................ 250/327.2 |
| 4,922,103 | 5/1990 | Kawajiri et al. .................. 250/327.2 |
| 5,745,544 | * 4/1998 | Mazess ................................. 378/56 |

FOREIGN PATENT DOCUMENTS 54-121043  9/1979 (JP) .

* cited by examiner

Primary Examiner—Que T. Le
(74) Attorney, Agent, or Firm—Sughrue, Mion, Zinn, Macpeak & Seas, PLLC

(57) ABSTRACT

Using a radiation image reading method and apparatus for reading a radiation image from a stimulable phosphor sheet on which the radiation image has been recorded, the radiation image is read quickly and an image signal having a preferable S/N ratio is obtained. A laser beam emitted from a laser beam source is reflected and deflected by a rotational polygon mirror and irradiated on the stimulable phosphor sheet storing the radiation image. Light emitted from the portion whereon the laser beam has been irradiated is photoelectrically converted by a line sensor composed of a plurality of solid state photoelectric conversion devices placed in line, and an image signal representing the radiation image recorded on the sheet is obtained.

2 Claims, 1 Drawing Sheet

F I G. 1
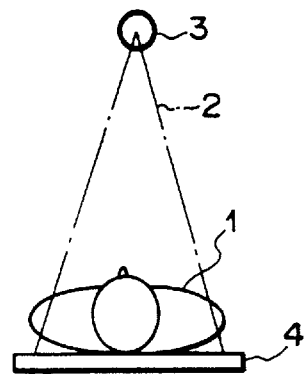
F I G. 2
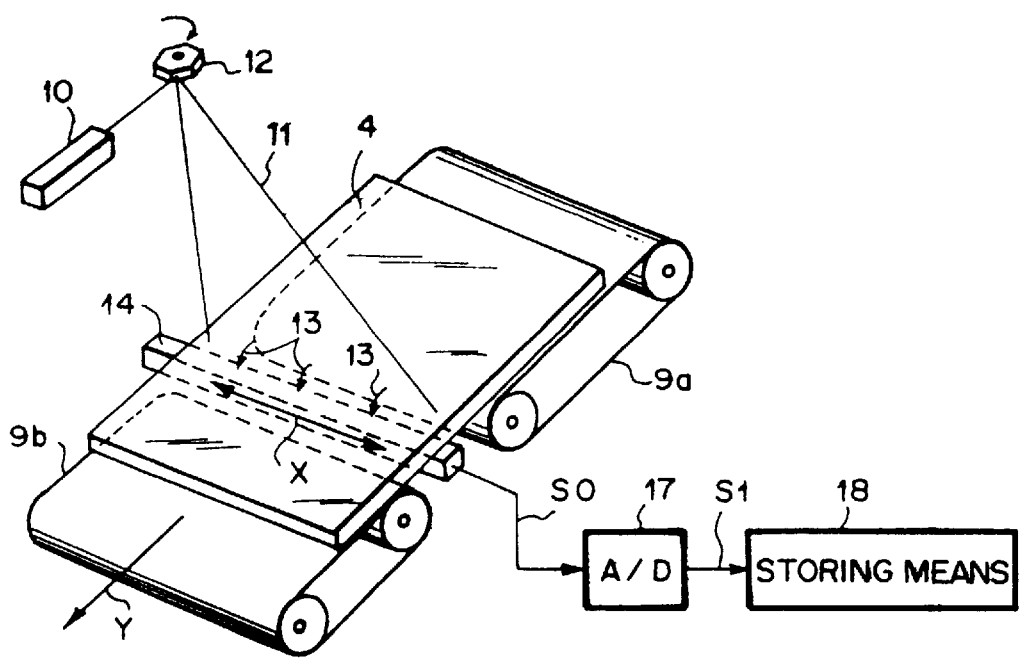

IMAGE READING METHOD AND APPARATUS HAVING A DEFLECTING DEVICE

BACKGROUND OF THE INVENTION

1. Field of the Invention

The present invention relates to an image reading method and apparatus for obtaining an image signal representing a radiation image from a stimulable phosphor sheet on which the radiation image has been recorded, by exposing the sheet to stimulating rays.

2. Description of the Related Art

Image recording and reproduction by reading a recorded radiation image to obtain an image signal representing the image and then applying appropriate image processing to the image signal has been carried out in various fields. For example, a system which can obtain reproduced images having preferable quality such as preferable contrast, sharpness, and graininess has been developed (see Japanese Patent Publication No. 61(1986)-5193). In this system, an X-ray image is recorded on a film having a low gamma value designed to be suitable for subsequent image processing, and the film recording the X-ray image is read to obtain an electrical signal. A visible image such as a copied photograph is reproduced after image processing has been carried out on the electrical signal (image signal).

The applicant has already proposed a radiation image recording reproducing system using stimulable phosphor which emits light, upon exposure to stimulating rays such as visible light, in accordance with stored radiation energy originated from radiation (such as X-rays, $\alpha$-rays, $\beta$-rays, $\gamma$-rays, electron rays, and ultraviolet rays) having been irradiated thereon (see Japanese Unexamined Patent Publication Nos. 55(1980)-12429, 56(1981)-11395, 55(1980)-163472, 56(1981)-164645, and 55(1980)-116340, for example). In this system, a radiation image of a subject such as a human body is recorded on a stimulable phosphor sheet and the sheet is scanned with stimulating rays such as a laser beam to cause the sheet to emit light. The light is photoelectrically detected by reading means such as a photomultiplier to obtain an image signal. Based on the image signal, the radiation image of the subject is then output as a visible image on a recording material such as a photosensitive material or on a CRT display.

As means in such a system for photoelectrically reading light emitted from a stimulable phosphor sheet, an image reading apparatus which comprises a line sensor having a plurality of solid state photoelectric conversion devices placed in line has been proposed (Japanese Unexamined Patent Publication Nos. 60(1985)-111568 and 60(1985)-236354, for example). The image reading apparatus such as those described therein irradiates a streak of stimulating rays on a stimulable phosphor sheet by using a light source array comprising LED's or semiconductor lasers placed linearly in order to cause the LED's or the semiconductor lasers to emit light simultaneously, or by using a combination of a non-directional light source such as a fluorescent lamp or a Xe lamp and an aperture such a slit or a row of small holes. The light emitted from a portion whereon the stimulating rays have been irradiated is photoelectrically read by the line sensor.

By using a line sensor as has been described above, a light source and reading means can be made small, which leads to down-sizing of the apparatus. Furthermore, since the line sensor can be placed close to a stimulable phosphor sheet, light detection efficiency can be improved. Moreover, since a line sensor can carry out reading of one line at a time, a radiation image can be read quickly.

However, in a reading apparatus using a line sensor, since stimulating rays are irradiated on a stimulable phosphor sheet by using a slit or the like, the amount of stimulating rays to be actually irradiated on the sheet is reduced by the slit even when the amount of rays from the light source is sufficient. Therefore, sufficient-amount stimulating rays cannot be irradiated on the stimulable phosphor sheet and the light emitted from the sheet consequently decreases. As a result, the S/N ratio of an image signal obtained by the line sensor deteriorates. When a light source array such as LED's is used, a sufficient amount of stimulating rays can be obtained. However, since a variance in intensity of the rays is observed between near the center of each LED and at each space between LED's, the light emitted from a sheet has a similar intensity variance. As a result, when an image signal obtained thereby is reproduced, an image having a linear density variance can be generated. Furthermore, some light source arrays have a slit to cause a beam emitted therefrom to be thin in order to enhance sharpness of a reproduced image, which leads to S/N ratio deterioration similar to the one described above, due to reduction in the amount of stimulating rays caused by the slit.

SUMMARY OF THE INVENTION

The present invention has been created based on consideration of the above problems. An object of the present invention is to provide an image reading method and apparatus which can read radiation images quickly without a reduction in S/N ratio.

An image reading method of the present invention comprising the steps of reflecting and deflecting a laser beam emitted from a laser beam source, converting a radiation image into light emitted from a stimulable phosphor sheet on which the radiation image has been recorded by linearly main-scanning the stimulable phosphor sheet with the laser beam while vertical-scanning the sheet in a direction approximately orthogonal to the main scan direction, and reading the emitted light by using a line sensor comprising a plurality of solid state photoelectric conversion devices which are placed in a length of at least the linear main scan and carry out reception and photoelectric conversion of the emitted light.

An image reading apparatus of the present invention comprises:

a laser beam source for emitting a laser beam;

main scan means for carrying out main scan linearly on a stimulable phosphor sheet on which a radiation image has been recorded, by reflecting and deflecting the laser beam;

vertical scan means for carrying out vertical scan on the stimulable phosphor sheet in a direction approximately orthogonal to the main scan direction; and a line sensor comprising a plurality of solid state photoelectric conversion devices placed in a length of at least it the linear main scan and for carrying out reception and photoelectric conversion of light emitted from the stimulable phosphor sheet upon exposure of the sheet to the laser beam.

According to the image reading method and apparatus of the present invention, a laser beam is reflected and deflected to linearly main-scan a stimulable phosphor sheet and an image signal representing a radiation image is obtained by receiving light emitted from the sheet upon the main scan by using the line sensor. By carrying out linear main scan with a laser beam on the stimulable phosphor sheet in this manner, a sufficient amount of light can be emitted by exposing the sheet to a sufficient amount of stimulating rays. In this manner, an image signal having a preferable S/N ratio can be obtained. Furthermore, by increasing a speed of the main scan with the laser beam and a speed of the vertical scan of the stimulable phosphor sheet, fast radiation image reading can be carried out.

In the case where a radiation image is read by a photomultiplier, light emitted from a stimulable phosphor sheet enters the photomultiplier in time series and converted into a digital image signal after photoelectric conversion of the light. At this time, when a laser beam is irradiated at a fast speed in the main scan direction, a value of a pixel interferes with that of a neighboring pixel due to residual light and a slow response. Therefore, no image signal having preferable responsiveness can be obtained. Meanwhile, a line sensor can carry out detection of emitted light by each solid state photoelectric conversion device corresponding to each pixel. Therefore, no pixel value interference occurs as in the case of a photomultiplier when a laser beam is irradiated as a fast speed. In this manner, according to the present invention, a radiation image can be read quickly with preferable responsiveness.

BRIEF DESCRIPTION OF THE DRAWINGS

FIG. 1 is an illustation showing a radation image photographing apparatus; and

FIG. 2 is an illustration showing an image reading apparatus according to an embodiment of the present invention.

DESCRIPTION OF THE PREFERRED EMBODIMENT

Hereinafter, an embodiment of the present invention will be explained with reference to the accompanying drawings.

FIG. 1 shows a radiation image photographing apparatus. As shown in FIG. 1, a stimulable phosphor sheet 4 is placed on the apparatus and a radiation source 3 is driven to emit a radiation 2. The radiation 2 having passed through a subject 1 is irradiated on the stimulable phosphor sheet 4 and radiation image information of the subject 1 is recorded on the sheet 4.

A radiation image is read from the stimulable phosphor sheet 4 by an image reading apparatus according to the embodiment of the present invention shown in FIG. 2, and an image signal representing the radiation image is obtained.

The stimulable phosphor sheet 4 is placed on endless belts 9a and 9b which are forced to revolve by a motor not shown in FIG. 2. A laser beam source 10 which emits a laser beam 11 as stimulating rays, and a rotational polygon mirror 12 reflecting and deflecting the laser beam 11 for main scan of the sheet 4 and forced to rotate by a motor not shown in FIG. 2 are located above the sheet 4. Below the position of scan by the laser beam 11, a line sensor 14 under the sheet for receiving emitted light is located orthogonally to the direction in which the sheet 4 is conveyed. The line sensor 14 is connected to an A/D converter 17 which is connected to storing means 18.

The line sensor 14 is composed of solid state photoelectric conversion devices such as photoconductors or photodiodes placed in line. A signal representing a pixel of an image signal is obtained by photoelectric conversion of the emitted light carried out by each device. The signal representing a pixel may be obtained by a plurality of solid state photoelectric conversion devices. A filter for cutting the laser beam 11 and for transmitting only the emitted light is located in a light receiving surface of the line sensor 14.

The stimulable phosphor sheet 4 storing the radiation image of the subject is set on the endless belts 9a and 9b. The stimulable phosphor sheet 4 set at a predetermined position is conveyed (vertical-scanned) in the direction of an arrow Y by the endless belts 9a and 9b. Meanwhile, the laser beam 11 emitted from the laser beam source 10 is reflected and deflected by the rotational polygon mirror 12 driven by a motor not shown in FIG. 2 and rotating at a fast speed in the direction shown by an arrow in FIG. 2. The laser beam 11 enters the sheet 4 and main-scans the sheet 4 in the direction shown by an arrow X almost orthogonal to the vertical scan direction (the direction shown by the arrow Y). From the portion on which the laser beam 11 has been irradiated, light 13 having the amount in accordance with radiation image information stored thereon is emitted. The emitted light 13 is received by the line sensor 14 and the amount of the light 13 representing the radiation image is converted into an analog image signal S0 by each solid state photoelectric conversion device composing the line sensor 14.

The analog image signal S0 output from each device of the line sensor 14 is input to the A/D converter 17 and converted into a digital image signal S1 to be input to the storing means 18.

As has been described above, by using the line sensor 14, the present invention obtains the image signal S1 representing the radiation image by receiving the light 13 emitted from the stimulable phosphor sheet 4 upon exposure to the laser beam 11. By linearly irradiating the laser beam 11 on the stimulable phosphor sheet 4 as has been described above, a sufficient amount of stimulating rays can be irradiated on the sheet 4, compared with the apparatus using stimulating rays passing through a slit as described in Japanese Patent Laid-Open Publication No. Sho 60-111568, for example. In this manner, the image signal S1 having a preferable S/N ratio can be obtained. Furthermore, by increasing speeds of the main scan by the laser beam 11 and the vertical scan of the sheet 4, fast image reading can be carried out.

An experiment result regarding a relationship between reading time and the amount of emitted light obtained by using (1) an image reading apparatus using a conventional photomultiplier for receiving the emitted light, (2) an image reading apparatus using a line sensor for reading the light emitted upon exposure to a linear stimulating ray from a slit, and (3) the apparatus of the present invention is shown below.

|     | Reading time | The amount of emitted light |
| --- | --- | --- |
| (1) | 100 | 100 |
| (2) | 50 | 5 |
| (3) | 50 | 50 |

As shown in the above table, let the reading time and the amount of light for the case (1) be 100 and 100 respectively. If the reading time for the case (2) is shortened to 50 which is a half of the time for the case (1), the amount of emitted light is 5, which is substantially smaller. Therefore, no image signal having a preferable S/N ratio can be obtained. Meanwhile, for the case of the present invention, even when the reading time is 50 which is a half of the case of (1), the amount of emitted light is 50. Therefore, even when fast radiation image reading is carried out, a sufficient amount of emitted light and thus an image signal having a preferable S/N ratio can be obtained.

When a light source array using linearly placed LED's as a stimulating ray source is used, the intensity of the stimulating rays near the center of each LED differs from that at each space between LED's. Therefore, variance in intensity of the light emitted from the sheet 4 also occurs. As a result, a reproduced image having a linear density variance can be obtained when the obtained image signal S1 is reproduced. On the other hand, in the present invention, no variance in intensity of the stimulating rays occurs as in the case of the light source array, since the present invention uses the laser beam source 11 as a stimulating ray source. In this manner, the image signal S1 which can reproduce an image having no density variance can be obtained.

Meanwhile, radiation image reading apparatuses using photomultipliers have been known. In such apparatuses, light emitted from a stimulable phosphor sheet enters a photomultiplier in time series and is converted into a digital image signal after photoelectric conversion thereof. At this time, when a laser beam is irradiated quickly, residual light or slow response of the emitted light causes interference of a value of a pixel with that of a neighboring pixel. Therefore, no image signal having a preferable responsiveness can be obtained. On the other hand, the line sensor 14 detects the emitted light 13 by each solid state photoelectric conversion device corresponding to each pixel. Therefore, even when the laser beam 11 is irradiated quickly on the sheet 4, no pixel value interference as in the case of a photomultiplier occurs. Therefore, according to the present invention, a radiation image can be read quickly with preferable responsiveness.

In the above embodiment, the laser beam 11 is reflected and deflected by the rotational polygon mirror 12. However, it may be reflected and deflected by a galvanometer mirror or the like.

What is claimed is:

1. An image reading method comprising the steps of:

reflecting and deflecting a laser beam emitted from a laser beam source;

converting a radiation image into light emitted from a stimulable phosphor sheet upon which the radiation image has been recorded by linearly main-scanning the stimulable phosphor sheet with the laser beam while vertical-scanning the sheet in a direction approximately orthogonal to the main scan direction; and reading the light emitted from the sheet by using a line sensor comprising a plurality of solid state photoelectric conversion devices which are placed in a length of at least the linear main scan and carry out reception and photoelectric conversion of the emitted light.

2. An image reading apparatus comprising:

a laser beam source for emitting a laser beam;

main scan means for carrying out main scan linearly on a stimulable phosphor sheet upon which a radiation image has been recorded, by reflecting and deflecting the laser beam;

vertical scan means for carrying out vertical scan of the stimulable phosphor sheet in a direction approximately orthogonal to the main scan direction; and a line sensor comprising a plurality of solid state photoelectric conversion devices placed in a length of at least the linear main scan and for carrying out reception and photoelectric conversion of light emitted from the stimulable phosphor sheet upon exposure of the sheet to the laser beam.

* * * * *